(12) United States Patent
Kil et al.

(10) Patent No.: US 8,773,696 B2
(45) Date of Patent: Jul. 8, 2014

(54) METHOD AND SYSTEM FOR GENERATING DOCUMENT USING SPEECH DATA AND IMAGE FORMING APPARATUS INCLUDING THE SYSTEM

(75) Inventors: Hyun-sub Kil, Suwon-si (KR); Mok-hwa Lim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 302 days.

(21) Appl. No.: 13/295,181

(22) Filed: Nov. 14, 2011

(65) Prior Publication Data

US 2012/0120446 A1 May 17, 2012

(30) Foreign Application Priority Data

Nov. 12, 2010 (KR) .................. 10-2010-0113000

(51) Int. Cl.
*G06F 3/12* (2006.01)
*G06K 15/00* (2006.01)

(52) U.S. Cl.
USPC .......... 358/1.15; 358/1.18; 358/1.2; 358/1.9; 358/1.11; 358/1.16

(58) Field of Classification Search
None
See application file for complete search history.

(56) References Cited

U.S. PATENT DOCUMENTS

| 2004/0111265 | A1* | 6/2004 | Forbes ..................... | 704/260 |
| 2005/0096910 | A1* | 5/2005 | Watson et al. ............ | 704/260 |
| 2005/0114129 | A1* | 5/2005 | Watson et al. ............ | 704/235 |

FOREIGN PATENT DOCUMENTS

JP          8-2015          1/1996

* cited by examiner

*Primary Examiner* — Dov Popovici
(74) *Attorney, Agent, or Firm* — Staas & Halsey LLP

(57) ABSTRACT

A document generation method and system using speech data, and an image forming apparatus including the document generation system. The method includes setting document editing information including at least one of document form information and sentence pattern information for editing a document when the speech data is generated as the document; converting the speech data into text; and generating the text as the document based on the document editing information.

20 Claims, 8 Drawing Sheets

FIG. 7

| PATTERN WORD | NEXT PAGING | BEGINNING OF NEW LINE | EMPHASIS | - |
|---|---|---|---|---|
| SPECIFIC WORD : CHAPTER | O | X | O | - |
| BLANK: WITHIN 5 SECONDS | X | O | X | - |
| BLANK: OVER 60 SECONDS | O | X | X | - |
| WORD WITH HIGH INTONATION | X | X | O | - |
| CHANGE OF SPEAKERS | X | O | X | - |
| SPECIFIC WORD: CERTAINLY, SURELY | X | X | O | - |

SENTENCE PATTERN SETTING

FIG. 8

DETAILS SETTING

A: HELLO
B: HOW DO YOU DO?
A: ...

810

BEGINNING OF NEW LINE | Italic
NEXT PAGING | Font Type
Font Size | Underline
Font Color | ...
Bold | ...

Back  Next

FIG. 12
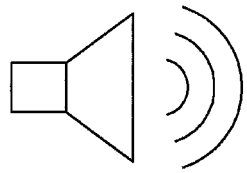
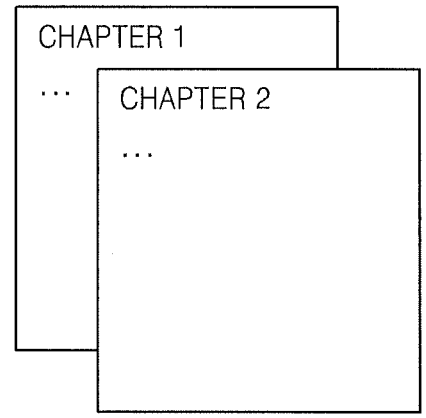
CHAPTER 1 ......
CHAPTER 2 ......
FIG. 13
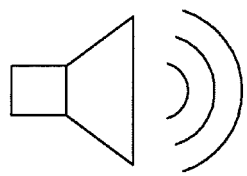
HELLO.
I AM KILDONG HONG.
PLEASE SURELY
REMEMBER ME.
FIG. 14
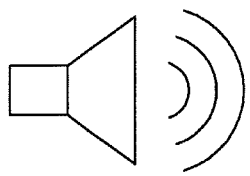
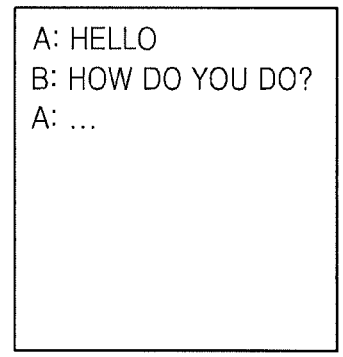
VOICE A: HELLO
VOICE B: HOW DO YOU DO?
VOICE A: ···

METHOD AND SYSTEM FOR GENERATING DOCUMENT USING SPEECH DATA AND IMAGE FORMING APPARATUS INCLUDING THE SYSTEM

CROSS-REFERENCE TO RELATED APPLICATIONS

This application claims the benefit of Korean Patent Application No. 10-2010-0113000, filed on Nov. 12, 2010, in the Korean Intellectual Property Office, the disclosure of which is incorporated herein in its entirety by reference.

BACKGROUND

1. Field

The present disclosure relates to speech recognition in an image forming apparatus, and more particularly, to a method and system for generating a document using speech data capable of increasing usability by providing a function of automatically editing the document using a speech feature.

2. Description of the Related Art

Image forming apparatuses generally perform functions of copying, faxing, scanning, printing, and the like. FIG. 1 illustrates a conventional image forming apparatus having a speech recognition function. Referring to FIG. 1, the image forming apparatus recognizes speech data input by using a voice to text function, converts the speech data into text, and sends and prints the text via email, server message block/file transfer protocol (SMB/FTP), an internal storage medium, an external storage medium, etc. The speech data is obtained from a telephone, a microphone, or a stored speech file. FIG. 2 illustrates a conventional image forming apparatus that prints input speech data as a final output.

Meanwhile, the development of a speech recognition technology facilitates the development of voice to text (VTT), text to voice (TTV), etc. It is useful if a stored speech file or speech data received through a phone is not simply printed but is automatically edited for the purpose of user convenience.

Speech recognition is a process of mapping an acoustic signal to text by using a computer or an information device. The information device converts speech data into text by using speech recognition.

However, a conventional technology uniformly converts speech data into a text file through VTT, and sends (via fax, email, and SMB/FTP) or prints the text file. Thus, no document editing is performed on the finally converted text file, which deteriorates usability of the finally converted text file.

SUMMARY

The present disclosure provides a method and system for generating a document by using speech data for identifying and automatically editing a feature (speaker identification and separation of an emphasized part) of each piece of speech data or words of a specific pattern (a chapter, etc.) during a process of converting a speech file stored in a universal serial bus (USB) memory stick or a network disk driver or speech data received over a phone into text in an image forming apparatus.

The present disclosure also provides an image forming apparatus capable of generating a document using speech data.

According to an aspect of the present disclosure, there is provided a document generation method using speech data, the method including setting document editing information including at least one of document form information and sentence pattern information for editing a document when the speech data is generated as the document; converting the speech data into text; and generating the text as the document based on the document editing information, wherein the document form information includes document editing items according to document expression forms with respect to whether the document is expressed in a dialog form, is expressed as the text for the speech data of a specific speaker, and indicates a time when the speech data is generated, and wherein the sentence pattern information includes document editing items with respect to sentence patterns such as turning of pages, beginning of a new line, and emphasis according to a specific word, accent, and a change of speaker included in the speech data.

The method may further include editing the document in detail through a preview with respect to beginning of a new line, turning of pages, a font size, a font color, and a bold type. The method may further include: setting an output method of outputting document data as at least one of printing, storing in a storage medium, and transmission.

According to another aspect of the present disclosure, there is provided a document generation system using speech data, the system including a document editing setting unit including at least one of a document form setting unit and a sentence pattern setting unit to set document editing information to edit a document when the speech data is generated as the document; and a document generation unit to convert the speech data into text, edit the text based on the document editing information set by the document editing setting unit, and generate the document, wherein the document form setting unit provides menus for previously setting the document editing information according to document expression forms with respect to whether the document is expressed in a dialog form, is expressed as the text for the speech data of a specific speaker, and indicates a time when the speech data is generated, and wherein the sentence pattern setting unit provides menus for previously setting the document editing information with respect to sentence patterns such as turning of pages, beginning of a new line, and emphasis according to a specific word, accent, and a change of speaker from the speech data.

The document editing setting unit may further include a details setting unit to edit the document in detail through a preview with respect to beginning of a new line, turning of pages, a font size, a font color, and a bold type. The system may further include an input setting unit to set the speech data as one of a speech file read from a storage medium, speech data received over a phone, and speech data input through a microphone. The system may further include an output setting unit to provide a menu to set an output method of outputting document data generated by the document generation unit as at least one of printing, storing in a storage medium, and transmission.

According to another aspect of the present disclosure, there is provided an image forming apparatus for generating a document using speech data, the image forming apparatus including a user interface unit to provide at least one of a document form setting menu and a sentence pattern setting menu to edit the document when the speech data is generated as the document; and a control unit to generate the speech data as the document based on the document editing information set through the user interface unit, wherein the document form setting menu includes menus for previously setting the document editing information according to document expression forms with respect to whether the document is expressed in a dialog form, is expressed as the text for the speech data of a specific speaker, and indicates a time when the speech data is generated, and wherein the sentence pattern setting unit provides menus for previously setting the document editing information with respect to sentence patterns such as turning of pages, beginning of a new line, and emphasis according to a specific word, accent, and a change of speaker from the speech data.

The user interface unit may further include a details setting menu to edit the document generated by the control unit in detail through a preview with respect to beginning of a new line, turning of pages, a font size, a font color, and a bold type.

The user interface unit may further include an input setting menu to set input speech data as one of a speech file read from a storage medium, speech data received over a phone, and speech data input through a microphone; a speech data storage unit to store the speech file; and a speech data receiving unit to receive the speech data received over the phone or through the microphone, wherein the control unit generates the speech data stored in the speech data storage unit or received from the speech data receiving unit as the document based on the speech data set by the input setting unit.

The image forming apparatus may further include an output setting menu to provide a menu to set an output method of outputting document data generated by the control unit as at least one of printing, storing in a storage medium, and transmission.

According to another aspect of the present invention, there is provided a computer readable recording medium having embodied thereon a computer program for executing the methods.

BRIEF DESCRIPTION OF THE DRAWINGS

The above and other features and advantages of the present disclosure will become more apparent by describing in detail exemplary embodiments thereof with reference to the attached drawings in which:

FIG. 7 shows a user interface screen when a sentence pattern setting button of FIG. 5 is selected and activated;

FIG. 8 shows a user interface screen when a details setting button of FIG. 5 is selected and activated;

FIG. 12 illustrates an automatic beginning of a new line or automatic turning of pages by capturing a core keyword, for example, "chapter";

FIG. 13 illustrates bold style printing on an emphasis region by determining an accent of a user; and FIG. 14 illustrates script printing or specific voice printing by classifying texts for users.

DETAILED DESCRIPTION

The present disclosure will now be described more fully with reference to the accompanying drawings, in which exemplary embodiments of the disclosure are shown.

Figure 1:
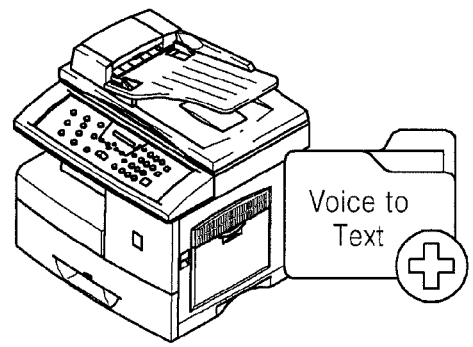
FIG. 1 illustrates a conventional image forming apparatus having a speech recognition function.
Figure 2:
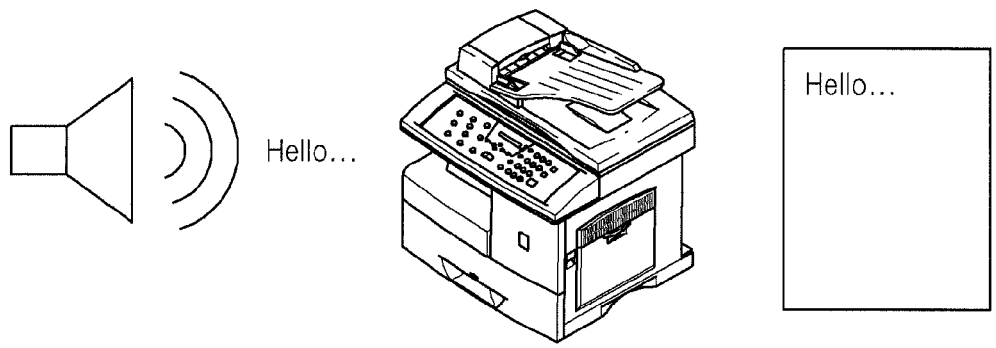
FIG. 2 illustrates a conventional image forming apparatus that prints input speech data as a final output.
Figure 3:
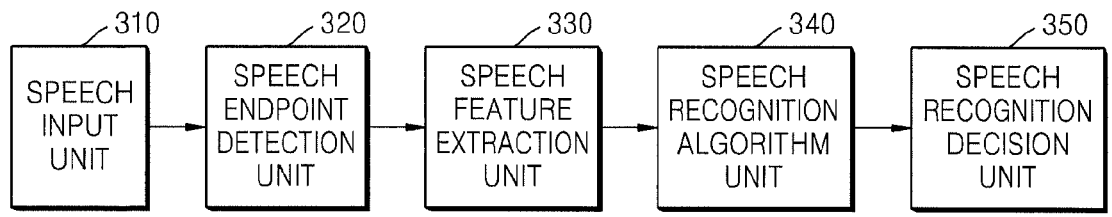
FIG. 3 is a block diagram of a speech recognition system.

FIG. 3 is a block diagram of a speech recognition system. Referring to FIG. 3, a speech input unit 310 receives human's voice in real time or stores speech data.

A speech endpoint detection unit 320 searches for a part including speech from the voice or speech data. That is, a speech part is detected from an input source.

A speech feature extraction unit 330 extracts a speech feature (filter) coefficient by modeling a human's vocal organ.

A speech recognition algorithm unit 340 recognizes speech by utilizing the extracted speech feature coefficient. General speech algorithms include dynamic time warping (DTW), hidden Markov modeling (HMM), artificial neural networks (ANN), etc.

A speech recognition decision unit 350 decides whether the speech recognition algorithm 340 correctly recognizes the speech or not.

Various variables used in the speech recognition algorithm 340 include pronunciation, a speaker, the number of words, a language model, word complexity, a signal to noise ratio (SNR), etc. The pronunciation includes keyword recognition, isolated word recognition, connected word recognition, continuous speech recognition, etc. The keyword recognition recognizes a keyword in a general sentence. The isolated word recognition recognizes a start and end of a pronounced word. The connected word recognition recognizes connected words. The continuous speech recognition recognizes a general dialog sentence.

The speaker includes speaker dependence, speaker independence, speaker adaptation, etc. The speaker dependence recognizes speech of a specific speaker. The speaker independence recognizes speech of an unspecific speaker. The speaker adaptation adapts an acoustic characteristic of a specific speaker while exhibiting the characteristic of the speaker independence. The number of words includes a small number, a medium number, and a large number. The small number is 1 through 99 words. The medium number is 100 through 999 words. The large number is 1000 or more words. The language model includes a finite state network and context dependence. The word complexity includes low (<10) and high (>100) word ambiguity and acoustic confusion. The SNR includes high (>30 dB) and low (<10 dB) surrounding noise levels.

Figure 4:
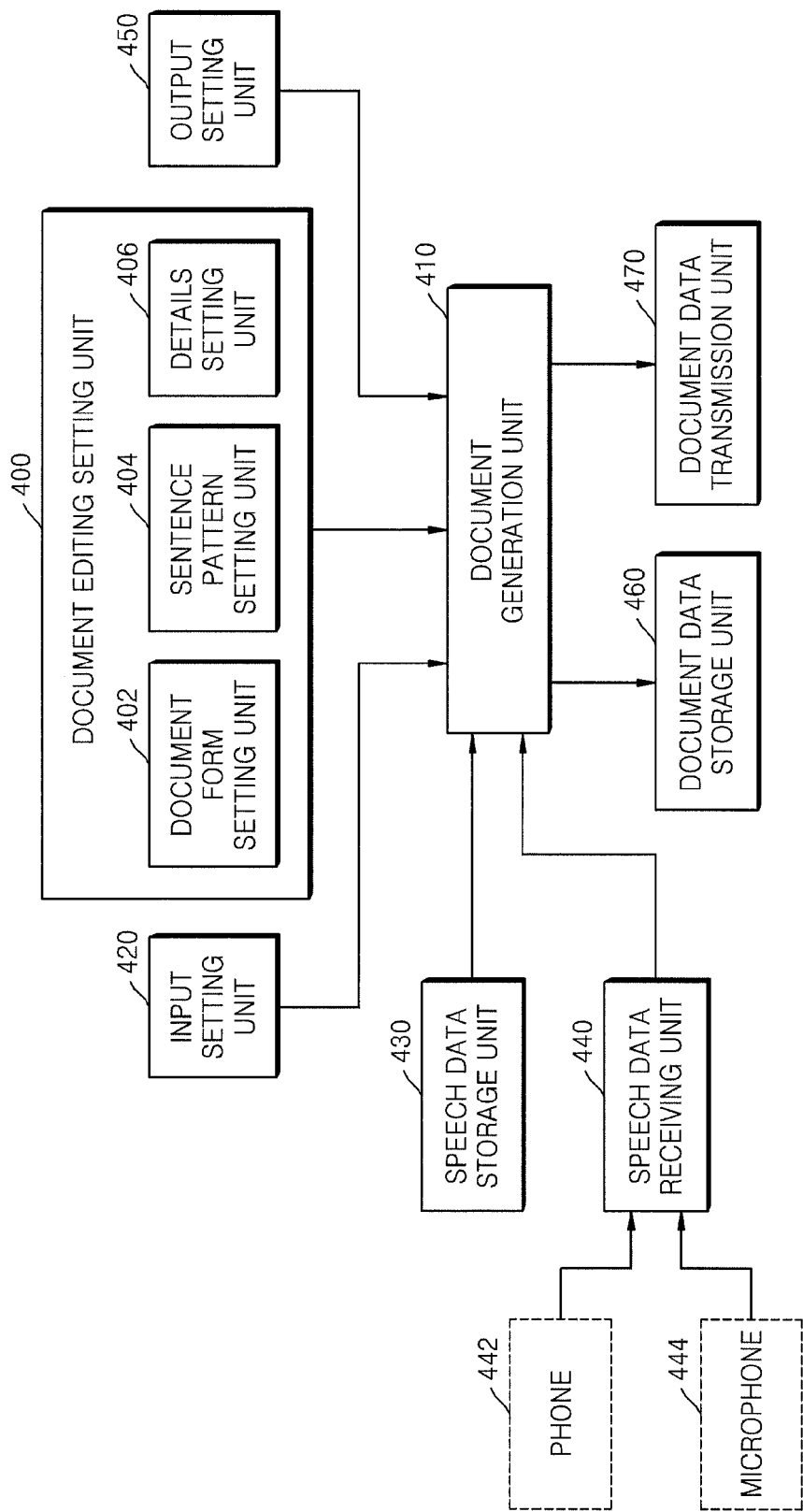
FIG. 4 is a block diagram of a document generation system using speech data according to an embodiment of the present disclosure.

FIG. 4 is a block diagram of a document generation system using speech data according to an embodiment of the present disclosure. Referring to FIG. 4, the document generation system includes a document editing setting unit 400 and a document generation unit 410. The document generation system may further include an input setting unit 420, a speech data storage unit 430, and a speech data receiving unit 440. The document generation system may further include an output setting unit 450, a document data storage unit 460, and a document data transmission unit 470.

The document editing setting unit 400 includes at least one of a document form setting unit 402 and a sentence pattern setting unit 404 for setting document editing information used to edit a document when the speech data is used to generate a document. The document editing setting unit 400 may further include a details setting unit 406.

The document form setting unit 402 provides a menu for previously setting the document editing information according to a document expression form such as whether the document is expressed in a dialog form, expresses the speech data of a specific speaker, displays the time when the speech data is generated, and the like.

The sentence pattern setting unit 404 provides a menu for previously setting the document editing information according to a sentence pattern with respect to turning of pages, beginning of a new line, emphasis, etc. according to a specific word, accent, changing of speakers, etc. included in the speech data.

The document expression form of the document form setting unit 402 or the sentence pattern of the sentence pattern setting unit 404 may include a text rearrangement, a format, paragraphing, and the like.

The details setting unit 406 may edit a document in detail, with respect to beginning of a new line, turning of pages, a font size, a font color, a bold type, etc., the document generated by the document generation unit 410 through a preview.

The document generation unit 410 converts the speech data into text, edits the text according to the document editing information set by the document editing setting unit 400, and generates the document.

The input setting unit 420 sets the speech data as one of a speech file read from a storage medium, speech data received over a phone, and speech data input through a microphone. The speech file may include speech data received through voice mail.

The speech data storage unit 430 stores the speech file when the input setting unit 410 sets the speech data as the speech file. The speech data receiving unit 440 receives the speech data over a phone 442 or through a microphone 444 when the input setting unit 430 sets the speech data to be received over the phone 442 or through the microphone 444. In this regard, the document generation unit 410 generates the document from the speech data input from the speech data storage unit 430 or the speech data receiving unit 440 according to information set by the input setting unit 420.

The output setting unit 450 provides a menu for setting an output method of the document generated by the document generation unit 410 as one of printing, storage in the storage medium, and transmission.

The document data storage unit 460 stores the document when the output setting unit 450 sets the output method as the storage in the storage medium.

The document data transmission unit 470 transmits the document to at least one of a facsimile machine, an email account, a server message block/file transfer protocol (SMB/FTP) server, a computer, and an eBook device when the output setting unit 450 sets the output method as transmission.

Figure 5:
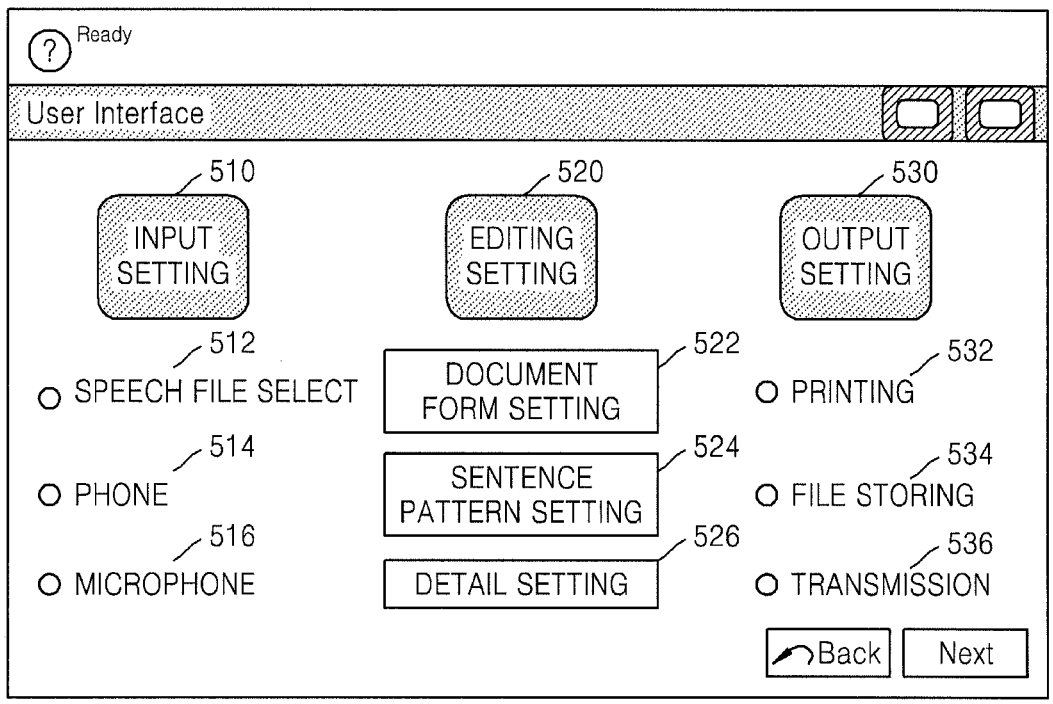
FIG. 5 shows a user interface screen that implements an input setting unit, a document editing setting unit, and an output setting unit.

FIG. 5 shows a user interface screen that implements the input setting unit 420, the document editing setting unit 400, and the output setting unit 450.

Referring to FIG. 5, the user interface screen displays the input setting unit 420 as an input setting box 510 providing menus including a speech file selection 512, a phone 514, and a microphone 516. If one of the speech file selection 512, the phone 514, and the microphone 516 is selected, the selected one is activated, and the menu corresponds to input setting information.

The user interface screen displays the document editing setting unit 400 as an editing setting box 520 providing menus including a document form setting button 522, a sentence pattern setting button 524, and a details setting button 526. If one of the document form setting button 522, the sentence pattern setting button 524, and the details setting button 526 is selected, the selected button is activated.

If the document form setting button 522 is clicked, the document form setting unit 402 is activated. If the sentence pattern setting button 524 is clicked, the sentence pattern setting unit 404 is activated. If the details setting button 526 is clicked, the details setting unit 406 is activated.

The user interface screen displays the output setting unit 450 as an output setting box 530 providing menus including printing 532, file storage 534, and transmission 536. If one of printing 532, file storage 534, and transmission 536 is selected, the selected one is activated. If at least one of the printing 532, file storage 534, and transmission 536 is selected, the selected one is stored as output setting information. When a document generated by the document generating unit 410 is output, the document is output based on the output setting information.

The input setting box 510, the editing setting box 520, and the output setting box 530 may be implemented having button shapes, and may be activated if the buttons are clicked.

Figure 6:
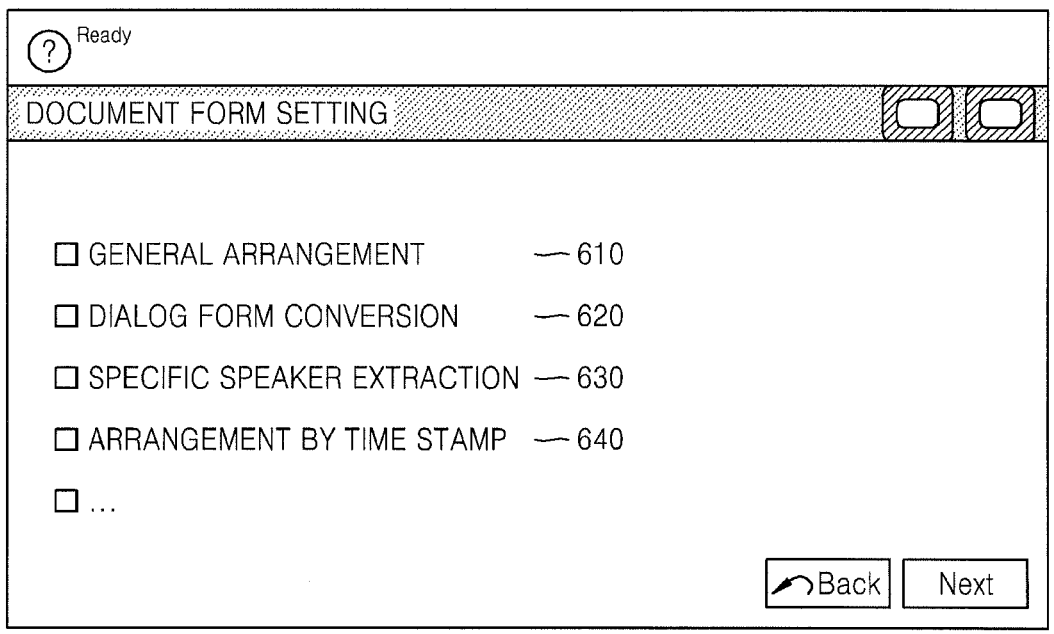
FIG. 6 shows a user interface screen when a document form setting button of FIG. 5 is selected and activated.

FIG. 6 shows a user interface screen when the document form setting button 522 of FIG. 5 is selected and activated. Referring to FIG. 6, the user interface screen provides menus including a general arrangement 610, a dialog form conversion 620, a specific speaker extraction 630, an arrangement for time stamps 640, and the like. The general arrangement 610 arranges texts converted from speech data without being edited when speech data is converted into text. The dialog form conversion 620 converts converted texts into dialog formats. The specific speaker extraction 630 extracts data of a specific speaker from a document. The arrangement for time stamps 640 indicates a time when the speech data is generated in the document when the document is edited. Thus, if at least one of the menus of the user interface screen implementing the document form setting button 522 is selected, the selected menu is set as document editing information. When the document generation unit 410 edits the document, the document is edited based on the document editing information.

FIG. 7 shows a user interface screen when the sentence pattern setting button 524 of FIG. 5 is selected and activated. Referring to FIG. 7, the user interface screen provides menus including a specific word, a blank, a word with high intonation, a speaker change, etc. as examples of settable sentence patterns. Editing items, such as turning of pages, beginning of a new line, emphasis, noise removal, etc., may be set according to the menus of sentence patterns.

FIG. 8 shows a user interface screen when the details setting button 526 of FIG. 5 is selected and activated. Referring to FIG. 8, if the document edited by the document generation unit 410 is displayed as a preview screen 810, a user may edit the document in detail by using menus including beginning of a new line, turning of pages, a font size, a font color, a bold type, an italic type, a font, an underline, etc. through the preview screen 810.

Figure 9:
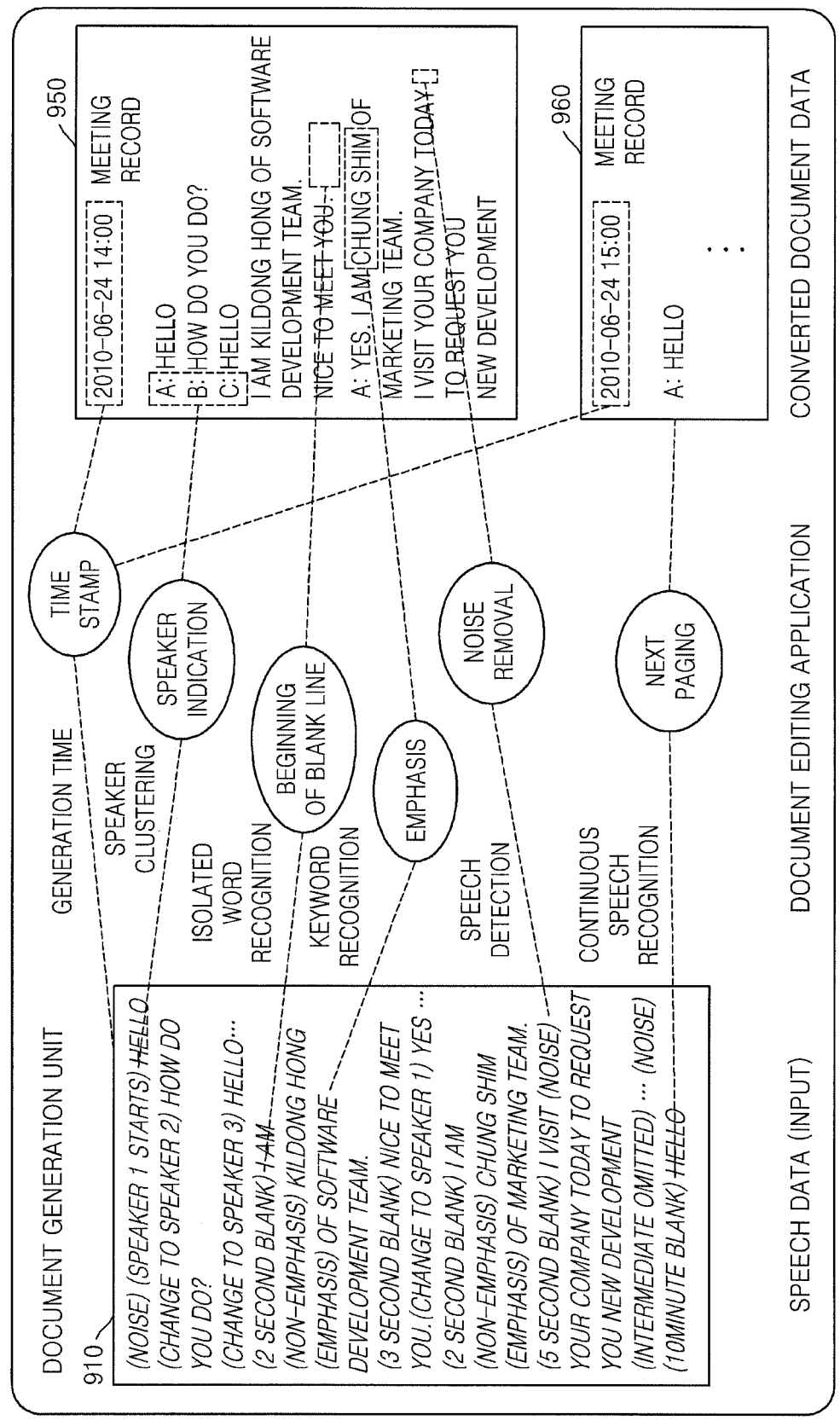
FIG. 9 is a diagram of an operation of a document generation unit according to an embodiment of the present disclosure.

FIG. 9 is a diagram of an operation of the document generation unit 410 according to an embodiment of the present disclosure. FIG. 9 shows document data 950 and 960 edited by applying document editing information to a resultant document 910 obtained by converting speech data into text.

Figure 10:
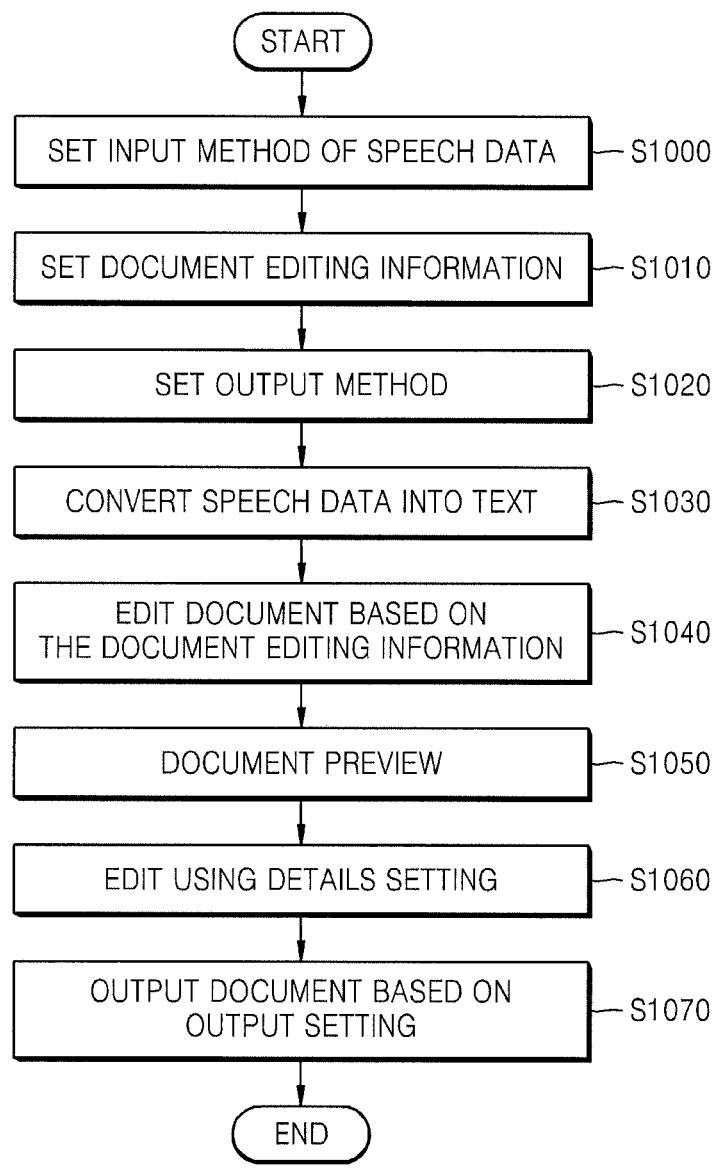
FIG. 10 is a flowchart illustrating a document generation method using speech data according to an embodiment of the present disclosure.

FIG. 10 is a flowchart illustrating a document generation method using speech data according to an embodiment of the present disclosure.

Referring to FIG. 10, speech data that is input through the input setting unit 420 is set (Operation S1000). The set speech data may be one of a speech file read from the storage unit 430, speech data received over a phone, speech data input through a microphone, and speech data received through voice mail.

Document editing information including information regarding document forms and/or information regarding sentence patterns for editing a document is set by using at least one of the document form setting unit 402 and the sentence pattern setting unit 404 of the document editing setting unit 400 (Operation S1010). The information regarding document forms may include document editing items according to document expression forms with respect to whether the document is expressed in a dialog form (dialog form conversion), expresses speech data of a specific speaker as text (specific speaker extraction), displays the time when the speech data is generated (arrangement by time stamps), and the like as shown in FIG. 6. The information regarding sentence patterns may include document editing items according to sentence patterns, with respect to a specific word, accent, turning of pages due to a change of speakers, beginning of a new line, emphasis, etc. included in the speech data as shown in FIG. 7.

To set how to output document data edited by the document generation unit 410, a document output method is set through the output setting unit 450 (Operation S1020). The document output method may be set as at least one of printing 532, storing of a file in a storage medium 534, and transmission 536 as shown in FIG. 5.

If the speech data is input, and the information regarding the document editing and document output is set through the input setting unit 420, the document editing setting unit 400, and the output setting unit 450, the document generation unit 410 converts the speech data set by the input setting unit 420 as text (Operation S1030).

The text is generated as a document based on the information regarding the document editing set by the document editing setting unit 400 (Operation S1040).

Meanwhile, the document may be edited in detail, with respect to beginning of a new line, turning of pages, a font size, a font color, a bold type, etc. according to detailed editing items set by the details setting unit 406 (Operation S1060) through a preview (Operation S1050).

If the detailed editing is completed in Operation S1060, the document is output based on output information set by the output setting unit 450 (Operation S1070). If the document output method set by the output setting unit 450 is set as storing of a file in a storage medium, a location and name of the file to be stored are designated, and the document data is stored in the document data storage unit 460. If the document output method set by the output setting unit 450 is set as transmission, the document data generated by the document generation unit 410 may be transmitted to one of a facsimile machine, an email account, an SMB/FTP server, a computer, etc.

Figure 11:
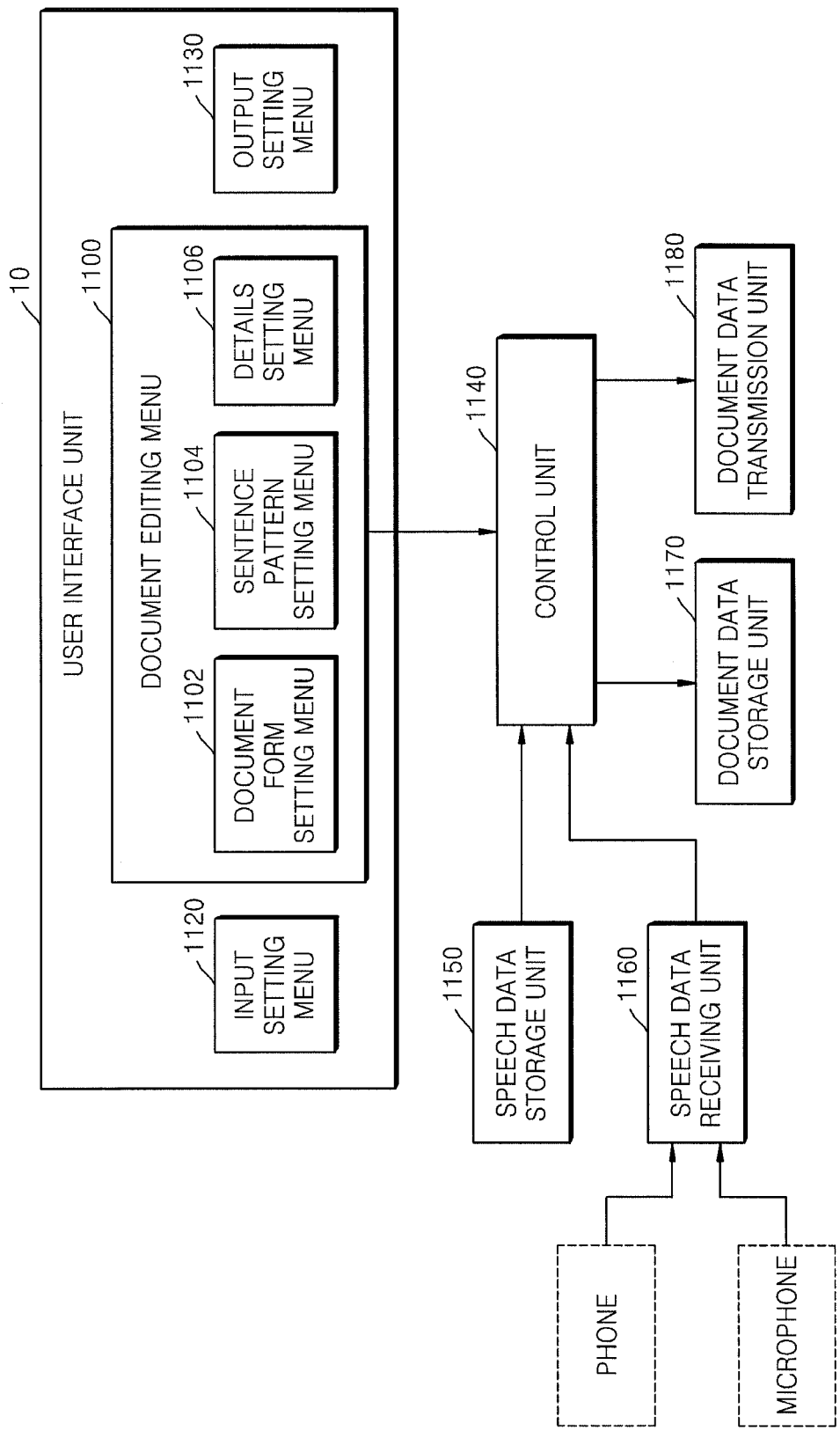
FIG. 11 is a block diagram of an image forming apparatus for generating a document using speech data according to an embodiment of the present disclosure.

FIG. 11 is a block diagram of an image forming apparatus for generating a document using speech data according to an embodiment of the present disclosure.

Referring to FIG. 11, the image forming apparatus includes a user interface unit 10 and a control unit 1140, and may further include at least one of a speech data storage unit 1150, a speech data receiving unit 1160, a document data storage unit 1170, and a document data transmitting unit 1180.

The user interface unit 10 provides a document editing menu 1100 for editing a document when the speech data is generated as the document. The document editing menu 1100 includes at least one of a document form setting menu 1102 and a sentence pattern setting menu 1104 for setting document editing information. The document form setting menu 1102 is used to previously set document editing information according to document expression forms with respect to whether the document is expressed in a dialog form, expresses speech data of a specific speaker, displays the time when the speech data is generated, etc. The sentence pattern setting menu 1104 is used to previously set the document editing information according to sentence patterns such as a specific word, accent, turning of pages due to a change of speakers, beginning of a new line, emphasis, etc. included in the speech data.

The user interface unit 10 may further include a details setting menu 1106 that edits a document generated by the control unit 1140 in detail, with respect to beginning of a new line, turning of pages, a font size, a font color, a bold type, etc. through a preview.

The control unit 1140 generates the speech data as the document based on document setting information set through the user interface unit 10.

Meanwhile, the user interface unit 10 may further include an input setting menu 1120. The input setting menu 1120 sets the speech data as one of a speech file stored in a storage medium, speech data received over a phone, and speech data input through a microphone. The speech file is stored in the speech data storage unit 1150. The speech data is received by the speech data receiving unit 1160 over the phone or through the microphone.

The control unit 1140 receives the speech data through the speech data storage unit 1150 or the speech data receiving unit 1160 based on the speech data set by the input setting menu 1120 and generates the received speech data as document data.

The user interface unit 10 may further include an output setting menu 1130 that provides a menu for setting an output method of the document data generated by the control unit 1140 as one of printing, storage in the storage medium, and transmission.

If the output method set by the output setting menu 1130 is the storage in the storage medium, the document data generated by the control unit 1140 is stored in the document data storage unit 1170 by designating a position and name of a file to be stored. The document data storage unit 1170 may be a storage medium that is included in or is excluded from the image forming apparatus.

If the output method set by the output setting menu 1130 is transmission, the document data is transmitted to one of a facsimile machine, an email account, an SMB/FTP server, a computer, etc. through the document data transmitting unit 1180.

In FIG. 5, the user interface unit 10 is implemented. The user interface unit 10 allows a user to convert speech data through the menus of the input setting box 510, the editing setting box 520, and the output setting box 530.

The input setting box 510 is used to select speech data to be processed. For example, the input setting box 510 may be used to select one of speech file data 512 in a file form that is stored in a storage medium (HDD or flash) included in the image forming apparatus or in a storage medium universal serial bus (USB) memory stick, a secure digital (SD) card, an external PC share folder, etc.) excluded from the information forming apparatus, speech data 514 received over a phone in real time, and speech data 516 input through an external speech processing terminal (microphone, speech input, etc.) in real time.

If the speech data received over the phone in real time or input through the external speech processing terminal in real time is selected by using the input setting box 510, the speech data receiving unit 1160 receives the speech data over the phone or through the external speech processing terminal in real time. If the speech file data in the file form is selected by using the input setting box 510, a speech file is read from the storage medium that is included in or excluded from the image forming apparatus.

The editing setting box 520 is used to set document editing information for converting the speech data selected by using the input setting box 510 into a document data form desired by the user, and includes the document form setting button 522, the sentence pattern setting button 524, and the details setting button 526.

The document form setting button 522 is used to set a document form of a finally produced document as the dialog form conversion 620, the specific speaker extraction 630, and the arrangement by time stamps 640 as shown in FIG. 6. The dialog form conversion 620 may set output document data in various ways, such as setting names for speakers, time expression, etc.

The specific speaker extraction 630 identifies a document of a specific speaker and generates the document. For example, the specific speaker extraction 630 may be used to output a document for each speaker or sentences in order of speakers.

The sentence pattern setting button 524 is used to set sentence patterns of the finally produced document, with respect to a specific word, a word with high intonation, a change of speakers, etc. as shown in FIG. 7.

The details setting button 526 provides the user with a function of editing in detail firstly converted data on which voice to text (VTT) is performed based on the document forms and sentence patterns set by the user through the document form setting button 522 and the sentence pattern setting button 524, through the preview 810 as shown in FIG. 8. The details setting button 526 may set beginning of a new line, paging, a font size, a font color, a bold type, and the like.

The output setting box 530 of FIG. 5 is used to set an output method of the document data to which a final form is applied.

The output setting box 530 is used to set a method of outputting the document data finally generated by using the input setting box 510 and the editing setting box 520. The user may select the printing 532, the storing of a file in a storage medium 534 included in or excluded from the image forming apparatus, and the transmission 536 of the document data to a fax machine, an email account, an SMB/FTP server, etc.

Meanwhile, the control unit 1140 that functions as a core role in converting speech data into document data in the image forming apparatus converts the speech data into text, and generates the document data for printing by applying formats to the text.

In FIG. 9, the control unit 1140 converts the input speech data into the document data. The control unit 1140 determines the feature of speech from the input speech data and applies a format selected by the user to the speech data. This is a format application operation of removing noise from the speech data, classifying speakers when speakers change, making a bold type on an emphasis part of high intonation, beginning a new line on a short blank, automatic turning of pages on a long blank, and applying a time stamp which indicates a dialog start time in the front of a document. Final products of the control unit 1140 are the document data 950 and 960 that are printable as shown in the right side of FIG. 9.

The control unit 1140 manages the document editing and outputting processes based on the document editing information and the document output information set by the document editing menu 1100 and the output setting menu 1130 during an operation of the image forming apparatus to generate a finally produced document. That is, the document editing process managed by the control unit 1140 edits the speech data set through the input setting menu 1120 of the user interface unit 10 as the finally produced document based on the document editing information set by the document editing menu 1100. The edited finally produced document is moved to the document data storage unit 1170 or the document data transmission unit 1180 managed by the control unit 1140 based on the document output information set by the output setting menu 1130 and is printed.

FIG. 12 illustrates automatic beginning of a new line or automatic paging by capturing a core keyword, for example, "chapter".

FIG. 13 illustrates bold style printing on an emphasis region by determining an accent of a user.

FIG. 14 illustrates script printing or specific voice printing by classifying texts for users.

Meanwhile, according to the present invention, a document converted by using a display apparatus can be directly edited through a graphic user interface. That is, a user can print a print region while correcting the printing region through a preview in a user interface provided by an image forming apparatus.

According to an embodiment of the present disclosure, a document can be automatically edited by using the speech feature in the image forming apparatus, thereby increasing usability of the document. The user can print speech data stored in the image forming apparatus and a received speech signal as a single document. Furthermore, the document is generated by analyzing the feature of the speech data, and adjusting formats and sentence patterns with respect to a font in accordance with the feature of the speech data, separation of paragraphs according to an editing request of the user, thereby increasing readability compared to a document converted through VTT, and increasing usability of the document.

Meanwhile, the above embodiments of the present disclosure may be embodied as a computer program. The computer program may be stored in a non-transitory computer-readable recording medium, and executed using a general digital computer. Data used in the aforesaid method may be recorded on a non-transitory computer-readable recording medium by using various means. Examples of the computer-readable medium include a magnetic recording medium (a ROM, a floppy disk, a hard disk, etc.), and an optical recording medium (a CD-ROM, a DVD, etc.).

While the present general inventive concept has been particularly shown and described with reference to exemplary embodiments thereof using specific terms, the embodiments and terms have been used to explain the present general inventive concept and should not be construed as limiting the scope of the present general inventive concept defined by the claims. The preferred embodiments should be considered in a descriptive sense only and not for purposes of limitation. Therefore, the scope of the general inventive concept is defined not by the detailed description of the general inventive concept but by the appended claims, and all differences within the scope will be construed as being included in the present general inventive concept.

What is claimed is:

1. A document generation method using speech data, the method comprising:

setting document editing information comprising document form information and sentence pattern information for editing a document when the speech data is generated as the document;

converting the speech data into text; and generating the text as the document based on the document editing information, wherein the document form information comprises document editing items according to document expression forms with respect to whether the document is expressed in a dialog form, is expressed as the text for the speech data of a specific speaker, and indicates a time when the speech data is generated, and wherein the sentence pattern information comprises document editing items with respect to sentence patterns including turning of pages, beginning of a new line, and emphasis according to a specific word, accent, and a change of speaker included in the speech data.

2. The method of claim 1, further comprising: editing the document in detail through a preview with respect to beginning of a new line, turning of pages, a font size, a font color, and a bold type.

3. The method of claim 1, wherein the speech data comprises one of a speech file read from a storage medium, speech data received over a phone, speech data input through a microphone, and speech data received through voice mail.

4. The method of claim 1, further comprising: setting an output method of outputting document data as at least one of printing, storing in a storage medium, and transmission.

5. The method of claim 4, further comprising: when the output method is set as the storing in the storage medium, designating a location and name of a file to be stored and storing the file in the storage medium.

6. The method of claim 4, further comprising: when the output method is set as transmission, transmitting the document data to one of a facsimile machine, an email account, a server message block/file transfer protocol, SMB/FTP, server, and a computer.

7. A document generation system using speech data, the system comprising:
 a document editing setting unit comprising a document form setting unit and a sentence pattern setting unit to set document editing information to edit a document when the speech data is generated as the document; and
 a document generation unit to convert the speech data into text, editing the text based on the document editing information set by the document editing setting unit, and generating the document,
 wherein the document form setting unit provides menus for previously setting the document editing information according to document expression forms with respect to whether the document is expressed in a dialog form, is expressed as the text for the speech data of a specific speaker, and indicates a time when the speech data is generated, and
 wherein the sentence pattern setting unit provides menus for previously setting the document editing information with respect to sentence patterns including turning of pages, beginning of a new line, and emphasis according to a specific word, accent, and a change of speaker from the speech data.

8. The system of claim 7, wherein the document editing setting unit further comprises: a details setting unit to edit the document in detail through a preview with respect to beginning of a new line, turning of pages, a font size, a font color, and a bold type.

9. The system of claim 7, further comprising: an input setting unit to set the speech data as one of a speech file read from a storage medium, speech data received over a phone, and speech data input through a microphone.

10. The system of claim 9, wherein the speech file comprises speech data received through voice mail.

11. The system of claim 9, further comprising:
 when the input setting unit sets the speech file, a speech data storage unit to store the speech file; and
 when the input setting unit sets the speech data received over the phone or through the microphone, a speech data receiving unit to receive the speech data received over the phone or through the microphone,
 wherein the document generation unit generates the speech data stored in the speech data storage unit or received by the speech data receiving unit as the document based on the speech data set by the input setting unit.

12. The system of claim 7, further comprising: an output setting unit to provide a menu to set an output method of outputting document data generated by the document generation unit as at least one of printing, storing in a storage medium, and transmission.

13. The system of claim 12, further comprising: when the output setting unit sets the output method as the storing in the storage medium, a document data storage unit to store the document data.

14. The system of claim 12, further comprising: when the output setting unit sets the output method as transmission, a document data transmitting unit to transmit the document data to one of a facsimile machine, an email account, an SMB/FTP server, and a computer.

15. An image forming apparatus for generating a document using speech data, the image forming apparatus comprising:
 a user interface unit to provide setting document editing information comprising a document form setting menu and a sentence pattern setting menu to edit the document when the speech data is generated as the document; and
 a control unit to generate the speech data as the document based on the document editing information set through the user interface unit,
 wherein the document form setting menu comprises menus for previously setting the document editing information according to document expression forms with respect to whether the document is expressed in a dialog form, is expressed as text for the speech data of a specific speaker, and indicates a time when the speech data is generated, and
 wherein the sentence pattern setting menu provides menus for previously setting the document editing information with respect to sentence patterns including turning of pages, beginning of a new line, and emphasis according to a specific word, accent, and a change of speaker from the speech data.

16. The image forming apparatus of claim 15, wherein the user interface unit further comprises: a details setting menu to edit the document generated by the control unit in detail through a preview with respect to beginning of a new line, turning of pages, a font size, a font color, and a bold type.

17. The image forming apparatus of claim 15, wherein the user interface unit further comprises: an input setting menu to set input speech data as one of a speech file read from a storage medium, speech data received over a phone, and speech data input through a microphone;
 a speech data storage unit to store the speech file; and
 a speech data receiving unit to receive the speech data received over the phone or through the microphone,
 wherein the control unit generates the speech data stored in the speech data storage unit or received from the speech data receiving unit as the document based on the speech data set by the input setting menu.

18. The image forming apparatus of claim 15, further comprising: an output setting menu to provide a menu to set an output method of outputting document data generated by the control unit as at least one of printing, storing in a storage medium, and transmission.

19. The image forming apparatus of claim 18, further comprising: when the output setting menu sets the output method as the storing in the storage medium, a document data storage unit to store the document data.

20. The image forming apparatus of claim 18, further comprising: when the output setting menu sets the output method as transmission, a document data transmitting unit to transmit the document data to one of a facsimile machine, an email account, an SMB/FTP server, and a computer.

* * * * *